(12) United States Patent
Conti et al.

(10) Patent No.: US 10,540,265 B2
(45) Date of Patent: *Jan. 21, 2020

(54) USING TEST WORKLOAD RUN FACTS AND PROBLEM DISCOVERY DATA AS INPUT FOR BUSINESS ANALYTICS TO DETERMINE TEST EFFECTIVENESS

(71) Applicant: International Business Machines Corporation, Armonk, NY (US)

(72) Inventors: Thomas W. Conti, Poughkeepsie, NY (US); Michael E. Gildein, II, Wappinger Falls, NY (US); Kyle R. Moser, Stone Ridge, NY (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 132 days.

This patent is subject to a terminal disclaimer.

(21) Appl. No.: 15/197,831

(22) Filed: Jun. 30, 2016

(65) Prior Publication Data

US 2018/0004641 A1 Jan. 4, 2018

(51) Int. Cl.
*G06F 11/00* (2006.01)
*G06F 11/36* (2006.01)

(52) U.S. Cl.
CPC ...... *G06F 11/3684* (2013.01); *G06F 11/3688* (2013.01); *G06F 11/3692* (2013.01)

(58) Field of Classification Search
CPC ............ G06F 11/3684; G06F 11/3692; G06F 11/3688

USPC ........................................................ 714/38.1
See application file for complete search history.

(56) References Cited

U.S. PATENT DOCUMENTS

| | | |
|---|---|---|
| 5,881,238 A | 3/1999 | Aman et al. |
| 6,167,427 A | 12/2000 | Rabinovich et al. |
| 6,351,775 B1 | 2/2002 | Yu |
| 6,981,180 B1 | 12/2005 | Bailey et al. |
| 7,003,504 B1 | 2/2006 | Angus et al. |
| 7,080,378 B1 | 7/2006 | Noland et al. |
| 7,360,120 B2 | 4/2008 | De Pauw et al. |
| 7,475,157 B1 | 1/2009 | Tormasov |
| 7,561,988 B2 | 7/2009 | Matsunaga et al. |

(Continued)

OTHER PUBLICATIONS

List of IBM Patents or Patent Applications Treated as Related (Appendix P), Filed Sep. 16, 2016, 2 pages.

(Continued)

*Primary Examiner* — Yair Leibovich
(74) *Attorney, Agent, or Firm* — Cantor Colburn LLP; William Kinnaman

(57) ABSTRACT

Aspects of the present invention include a method, system and computer program product for utilizing various data to determine the effectiveness of a software testing procedure. The method includes preloading, by a processor, into a database data related to workloads and workload data, data related to analysis points, and customer data. The method also includes determining, by the processor, whether to modify a workload model, to run a workload or to perform one of post processing analytics or run time analytics. The method further includes performing, by the processor, one of post processing analytics or run time analytics of the data preloaded into the database.

13 Claims, 5 Drawing Sheets

(56) References Cited

U.S. PATENT DOCUMENTS

| | | | |
|---|---|---|---|
| 7,720,955 B1* | 5/2010 | Kelly | G06F 11/3447 709/223 |
| 7,770,140 B2* | 8/2010 | Bell | G06F 11/3457 716/101 |
| 7,860,097 B1 | 12/2010 | Lovett et al. | |
| 8,024,615 B2 | 9/2011 | Tarta | |
| 8,417,715 B1 | 4/2013 | Bruckhaus et al. | |
| 8,781,977 B1 | 7/2014 | Huberman et al. | |
| 8,850,270 B2 | 9/2014 | Heiper et al. | |
| 9,183,119 B2 | 11/2015 | Li et al. | |
| 9,317,407 B2 | 4/2016 | Sabin et al. | |
| 9,727,448 B1 | 8/2017 | Seibert, Jr. et al. | |
| 9,846,881 B2 | 12/2017 | Greene et al. | |
| 10,019,167 B2 | 7/2018 | Gray | |
| 2001/0013008 A1 | 8/2001 | Waclawski | |
| 2002/0156663 A1 | 10/2002 | Weber et al. | |
| 2002/0170022 A1 | 11/2002 | Shirai et al. | |
| 2004/0044744 A1 | 3/2004 | Grosner et al. | |
| 2005/0187990 A1 | 8/2005 | Pace | |
| 2006/0095311 A1 | 5/2006 | Thompson | |
| 2007/0022426 A1 | 1/2007 | Steinder et al. | |
| 2007/0067369 A1* | 3/2007 | Minshall | G06F 11/3447 |
| 2007/0276871 A1 | 11/2007 | Fu et al. | |
| 2008/0028409 A1 | 1/2008 | Cherkasova | |
| 2008/0189350 A1 | 8/2008 | Vasa et al. | |
| 2011/0196857 A1* | 8/2011 | Chen | G06F 17/30457 707/714 |
| 2012/0095956 A1 | 4/2012 | Xiong et al. | |
| 2012/0110589 A1 | 5/2012 | Ghosh et al. | |
| 2012/0131104 A1 | 5/2012 | Beaven et al. | |
| 2012/0297251 A1 | 11/2012 | Masser et al. | |
| 2013/0007126 A1 | 1/2013 | Ziemann | |
| 2013/0073473 A1 | 3/2013 | Heath | |
| 2013/0162444 A1 | 6/2013 | Boulanger et al. | |
| 2013/0185021 A1* | 7/2013 | Addison | G06F 11/3428 702/186 |
| 2013/0212264 A1 | 8/2013 | Troppens et al. | |
| 2014/0033055 A1 | 1/2014 | Gardner et al. | |
| 2014/0109002 A1 | 4/2014 | Kimball | |
| 2014/0337429 A1 | 11/2014 | Asenjo et al. | |
| 2014/0344787 A1 | 11/2014 | Cochrane et al. | |
| 2015/0032691 A1 | 1/2015 | Hall et al. | |
| 2015/0046363 A1 | 2/2015 | McNamara et al. | |
| 2015/0113162 A1 | 4/2015 | Chan et al. | |
| 2015/0317337 A1 | 11/2015 | Edgar | |
| 2015/0363348 A1 | 12/2015 | Haynes | |
| 2016/0188370 A1* | 6/2016 | Razin | G06F 11/30 718/104 |
| 2016/0224392 A1 | 8/2016 | Clarke et al. | |
| 2016/0231999 A1 | 8/2016 | Holler et al. | |
| 2017/0250885 A1 | 8/2017 | Donovan | |
| 2018/0004634 A1* | 1/2018 | Brown | G06F 11/3668 |
| 2018/0004641 A1* | 1/2018 | Conti | G06F 11/3684 |
| 2018/0004642 A1* | 1/2018 | Conti | G06F 11/3684 |
| 2018/0284756 A1* | 10/2018 | Cella | G05B 23/024 |
| 2019/0265971 A1* | 8/2019 | Behzadi | G06F 8/77 |

OTHER PUBLICATIONS

Thomas R. Brown, et al., Pending U.S. Appl. No. 15/264,269 Entitled "Using Customer Profiling and Analytics to Create a Relative, Targeted, and Impactful Customer Profiling Environment/ Workload Questionnaire" filed with the USPTO Sep. 14, 2016.

Thomas W. Conti, et al., Pending U.S. Appl. No. 15/259,094 Entitled "Z/OS SMF Record Navigation Visualization Tooling" filed with the USPTO Sep. 8, 2016.

Thomas W. Conti, et al., Pending U.S. Appl. No. 15/259,099 Entitled "Measuring and Optimizing Test Resources and Test Coverage Effectiveness Through Run Time Customer Profiling and Analytics" filed with the USPTO Sep. 8, 2016.

Thomas W. Conti, et al., Pending U.S. Appl. No. 15/259,104 Entitled "Using Customer Profiling and Analytics to Understand, Rank, Score, and Visualize Best Practices" filed with the USPTO Sep. 14, 2016.

Thomas W. Conti, et al., Pending U.S. Appl. No. 15/259,107 Entitled "Using Best Practices Customer Adoption Business Intellegence Data as Input to Enterprise Resource Planning (ERP)" filed with the USPTO Sep. 8, 2016.

Thomas W. Conti, et al., Pending U.S. Appl. No. 15/259,110 Entitled "Using Run Time and Historical Customer Profiling and Analytics to Determine Customer Test vs. Production Differences, and to Enhance Customer Test Effectiveness" filed with the USPTO Sep. 8, 2016.

Thomas W. Conti, et al., Pending U.S. Appl. No. 15/259,115 Entitled "Using Run Time and Historical Customer Profiling and Analytics to Determine Customer Disaster Recovery vs Production Differences, and to Enhance Customer Disaster Recovery Readiness and Effectiveness" filed with the USPTO Sep. 8, 2016.

Thomas W. Conti, et al., Pending U.S. Appl. No. 15/259,120 Entitled "Determining If Customer Characteristics by Customer Gography, Country, Culture or Industry May Be Further Applicable to a Wider Customer Set" filed with the USPTO Sep. 8, 2016.

Thomas W. Conti, et al., Pending U.S. Appl. No. 15/259,122 Entitled "Using Customer and Workload Profiling and Analytics to Determine Score, and Report Portability of Customer and Test Environments and Workloads" filed with the USPTO Sep. 8, 2016.

Thomas W. Conti, et al., Pending U.S. Appl. No. 15/259,124 Entitled "Using Customer Profiling and Analytics to Understand Customer Workload Complexity and Characteristics by Customer Geography, Country, and Cuture" filed with the USPTO Sep. 8, 2016.

Thomas W. Conti, et al., Pending U.S. Appl. No. 15/259,130 Entitled "Using Workload Profiling and Analytics and Score Complexity of Test Environments and Workloads" filed with the USPTO Sep. 8, 2016.

Thomas W. Conti, et al., Pending U.S. Appl. No. 15/259,168 Entitled "Using Customer Profiling and Analytics to Understand Customer Environment and Workload Complexity and Characteristics by Industry" filed with the USPTO Sep. 8, 2016.

Thomas W. Conti, et al., Pending U.S. Appl. No. 15/264,630 Entitled "Using Customer Workload Profiling and Analytics to understand and Visualize Customer Workload Execution" filed with the USPTO Sep. 14, 2016.

Thomas W. Conti, et al., Pending U.S. Appl. No. 15/264,631 Entitled "Using Run Time and Historical Customer Profiling and Analytics to Iteratively Design, Develop, Test, Tune, and Maintain a Customer-Like Test Workload" filed with the USPTO Sep. 14, 2016.

Thomas W. Conti, et al., Pending U.S. Appl. No. 15/264,632 Entitled "Using Customer Profiling and Analytics to More Accurately Estimate and Generate and Agile Bill of Requirements and Sprints for Customer or Test Workload Port" filed with the USPTO Sep. 14, 2016.

Thomas W. Conti, et al., Pending U.S. Appl. No. 15/264,634 Entitled "Standardizing Run-Time and Historical Customer and Test Environments and Workloads Comparisons Using Specific Sets of Key Platform Data Points" filed with the USPTO Sep. 14, 2016.

Thomas W. Conti, et al., Pending U.S. Appl. No. 15/264,638 Entitled "Using Run-Time and Historical Customer Profiling and Analytics to Determine and Score Customer Adoption Levels of Platform Technologies" filed with the USPTO Sep. 14, 2016.

Thomas W. Conti, et al., Pending U.S. Appl. No. 15/264,639 Entitled "Standardizing Customer and Test Data and Information Collection for Runtime and Historical Profiling Environments and Workload Comparisons" filed with the USPTO Sep. 14, 2016.

List of IBM Patents or Patent Applications Treated as Related (Appendix P), Filed Apr. 18, 2017, 2 pages.

Thomas R. Brown, et al., Pending U.S. Appl. No. 15/424,971 Entitled "Run Time Workload Threshold Alerts For Customer Profiling Visualization" filed with the USPTO Feb. 6, 2017.

Thomas W. Conti, et al., Pending U.S. Appl. No. 15/424,965 Entitled "Using Customer Profiling and Analytics to Understand Customer Environment and Workload Complexity and Characteristics by Industry" filed with the USPTO Feb. 6, 2017.

(56) References Cited

OTHER PUBLICATIONS

Thomas W. Conti, et al., Pending U.S. Appl. No. 15/424,973 Entitled "Run Time Test Workload Customer Profiling Baselines Visualization" filed with the USPTO Feb. 6, 2017.
Thomas W. Conti, et al., Pending U.S. Appl. No. 15/427,130 Entitled "Visual Test Workload Execution Modeling" filed with the USPTO Feb. 8, 2017.
Thomas W. Conti, et al., Pending U.S. Appl. No. 15/427,135 Entitled "Run Time Automatic Workload Tuning Using Customer Profiling Workload Comparison" filed Feb. 8, 2017.
Thomas W. Conti, et al., Pending U.S. Appl. No. 15/427,137 Entitled "Using Test Workload Run Facts and Problem Discovery Data as Input for Business Analytics to Determine Test Effectiveness" filed Feb. 8, 2017.
Thomas W. Conti, et al., Pending U.S. Appl. No. 15/429,262 Entitled "Measuring and Optimizing Test Resources and Test Coverage Effectiveness Through Run Time Customer Profiling and Analytics" filed with the USPTO Feb. 10, 2017.
Thomas W. Conti, et al., Pending U.S. Appl. No. 15/429,265 Entitled "Using Run Time and Historical Customer Profiling and Analytics to Determine Customer Disaster Recovery vs Production Differences, and to Enhance Customer Disaster Recovery Readiness and Effectiveness" filed with the USPTO Feb. 10, 2017.
Thomas W. Conti, et al., Pending U.S. Appl. No. 15/429,268 Entitled "Using Workload Profiling and Analytics and Score Complexity of Test Environments and Workloads" filed with the USPTO Feb. 10, 2017.
Anonymous, "An Apparatus and Method to Perform the Effective Performance Test with Extra Load Generation" (Sep. 22, 2011) IP.com, IPCOM000211138D; 8 pgs.
IBM, et al., "Method and Apparatus of Optimized Tester Allocation During Multiple Release Testing" (Mar. 23, 2009) IP.com, IPCOM000180985D; 6 pgs.
List of IBM Patents or Patent Applications Treated as Related (Appendix P), Filed Jun. 30, 2016, 2 pages.
Phatak, A. M. V., et al., "Applying Hyperthreading Technology for Evaluating the Performance of HTTP Server for Stored Audio/ Video Retrieval" (2009) Second International Conference on Emerging Trends in Engineering and Technology, ICETET-09; 5 pgs.
Thomas R. Brown, et al., Pending U.S. Appl. No. 15/197,828 Entitled "Run Time and Historical Workload Report Scores for Customer Profiling Visualization" filed with the USPTO Jun. 30, 2016.
Thomas R. Brown, et al., Pending U.S. Appl. No. 15/197,835 Entitled "Z/OS SMF/RMF Workload Data Playback with Web Dashboard Visualization" filed with the USPTO Jun. 30, 2016.
Thomas W. Conti, et al., Pending U.S. Appl. No. 15/197,827 Entitled "Run Time Test Workload Customer Profiling Baselines Visualization" filed with the USPTO Jun. 30, 2016.
Thomas W. Conti, et al., Pending U.S. Appl. No. 15/197,829 Entitled "Run Time Automatic Workload Tuning Using Customer Profiling Workload Comparison" filed Jun. 30, 2016.
Thomas W. Conti, et al., Pending U.S. Appl. No. 15/197,833 Entitled "Run Time TPNS Workload Controls for Test Workload Tuning in Relation to Customer Profiling Workload" filed Jun. 30, 2016.
Thomas W. Conti, et al., Pending U.S. Appl. No. 15/197,843 Entitled "Visual Test Workload Execution Modeling" filed with the USPTO Jun. 30, 2016.
Thomas W. Conti, et al., Pending U.S. Appl. No. 15/197,844 Entitled "Run Time SMF/RMF Statistical Formula Methodology for Generating Enhanced Workload Data Points for Customer Profiling Visulization" filed Jun. 30, 2016.
Thomas R. Brown, et al., Pending U.S. Appl. No. 15/197,826 Entitled "Run Time Workload Threshold Alerts For Customer Profiling Visualization" filed with the USPTO Jun. 30, 2016.
Filed Jun. 30, 2016, U.S. Appl. No. 15/197,831.
Filed Jun. 30, 2016, U.S. Appl. No. 15/197,835.
Filed Jun. 30, 2016, U.S. Appl. No. 15/197,826.
Filed Jun. 30, 2016, U.S. Appl. No. 15/197,827.
Filed Jun. 30, 2016, U.S. Appl. No. 15/197,828.
Filed Jun. 30, 2016, U.S. Appl. No. 15/197,844.
Filed Jun. 30, 2016, U.S. Appl. No. 15/197,843.
Filed Jun. 30, 2016, U.S. Appl. No. 15/197,829.
Filed Jun. 30, 2016, U.S. Appl. No. 15/197,833.
Dias, "Make the Azure Portal Dashboard your own", Nov. 30, 2015, 7 pages.
Yu, "Understanding User Behavior in Large-Scale Video-on-Demand Systems," Apr. 2006, ACM, pp. 333-344.

* cited by examiner

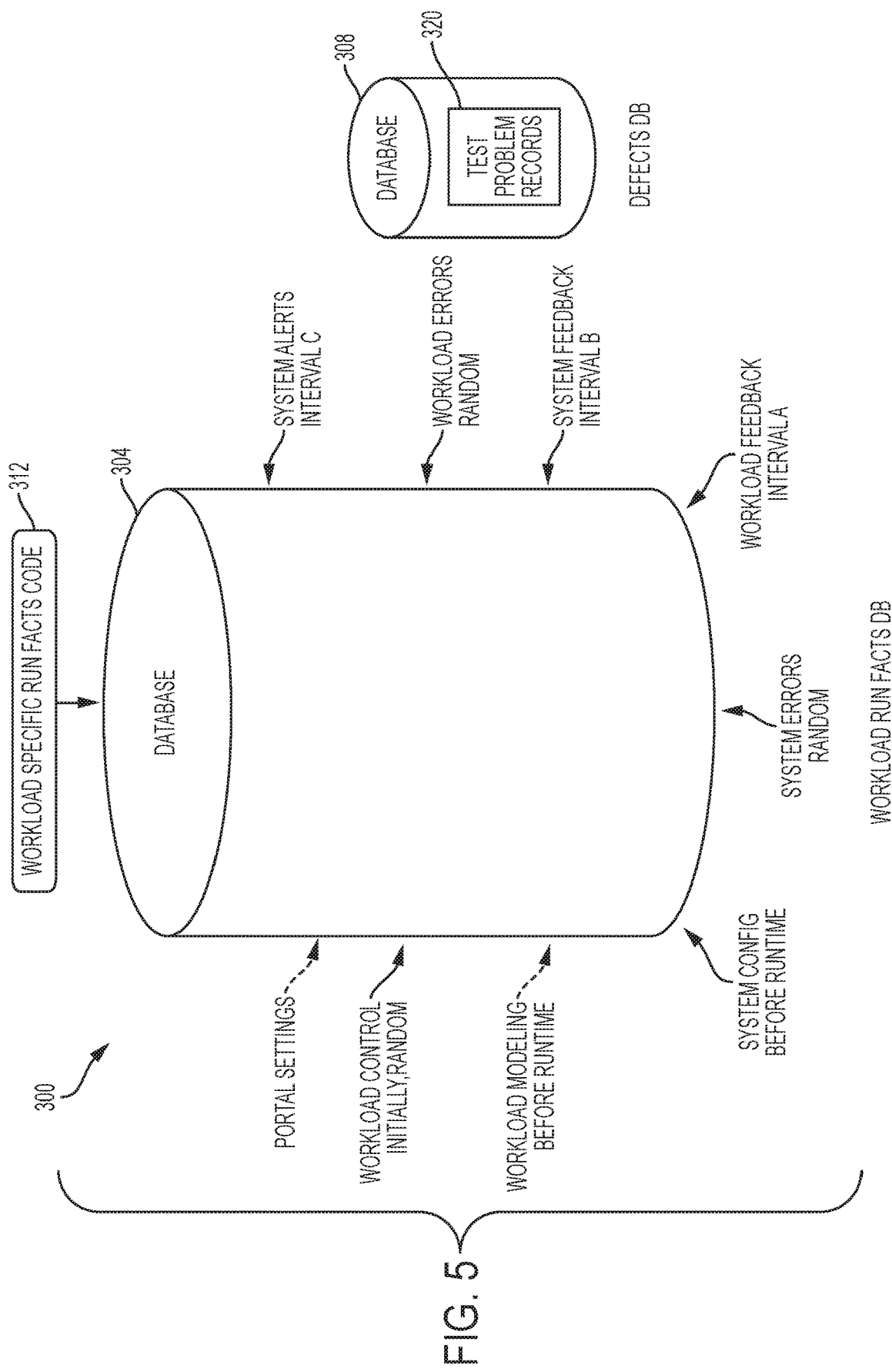

USING TEST WORKLOAD RUN FACTS AND PROBLEM DISCOVERY DATA AS INPUT FOR BUSINESS ANALYTICS TO DETERMINE TEST EFFECTIVENESS

BACKGROUND

The present invention relates to the testing of software, and more specifically, to a method, system and computer program product that implement aspects of workload and operational profiling, coupled with business analytics, thereby resulting in improvements in the testing of customer software.

In the field of software testing, as in many other technical fields, improvements are constantly being sought, primarily for cost and accuracy reasons. A fundamental goal of software testing in theory is to identify all of the problems in a customer's software program before the program is released for use by the customer. However, in reality this is far from the case as typically a software program is released to the customer having some number of problems that were unidentified during the software development and testing process.

A relatively more proactive approach to improving software testing is sought that employs traditional methods of understanding characteristics of clients' environments, augmented with a process of data mining empirical systems data. Such client environment and workload profiling analysis may result in software test improvements based on characteristics comparisons between the client and the test environments.

SUMMARY

According to one or more embodiments of the present invention, a computer-implemented method includes preloading, by a processor, into a database data related to workloads and workload data, data related to analysis points, and customer data. The method also includes determining, by the processor, whether to modify a workload model, to run a workload or to perform one of post processing analytics or run time analytics. The method further includes performing, by the processor, one of post processing analytics or run time analytics of the data preloaded into the database.

According to another embodiment of the present invention, a system includes a processor in communication with one or more types of memory, the processor configured to preload into a database data related to workloads and workload data, data related to analysis points, and customer data. The processor is also configured to determine whether to modify a workload model, to run a workload or to perform one of post processing analytics or run time analytics. The processor is further configured to perform one of post processing analytics or run time analytics of the data preloaded into the database.

According to yet another embodiment of the present invention, a computer program product includes a non-transitory storage medium readable by a processing circuit and storing instructions for execution by the processing circuit for performing a method that includes preloading, by a processor, into a database data related to workloads and workload data, data related to analysis points, and customer data. The method also includes determining, by the processor, whether to modify a workload model, to run a workload or to perform one of post processing analytics or run time analytics. The method further includes performing, by the processor, one of post processing analytics or run time analytics of the data preloaded into the database.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

FIG. 5 is a block diagram of a system having two databases that store various types of data for use with the method of FIG. 4 and in accordance with one or more embodiments of the present invention.

DETAILED DESCRIPTION

Figure 1:
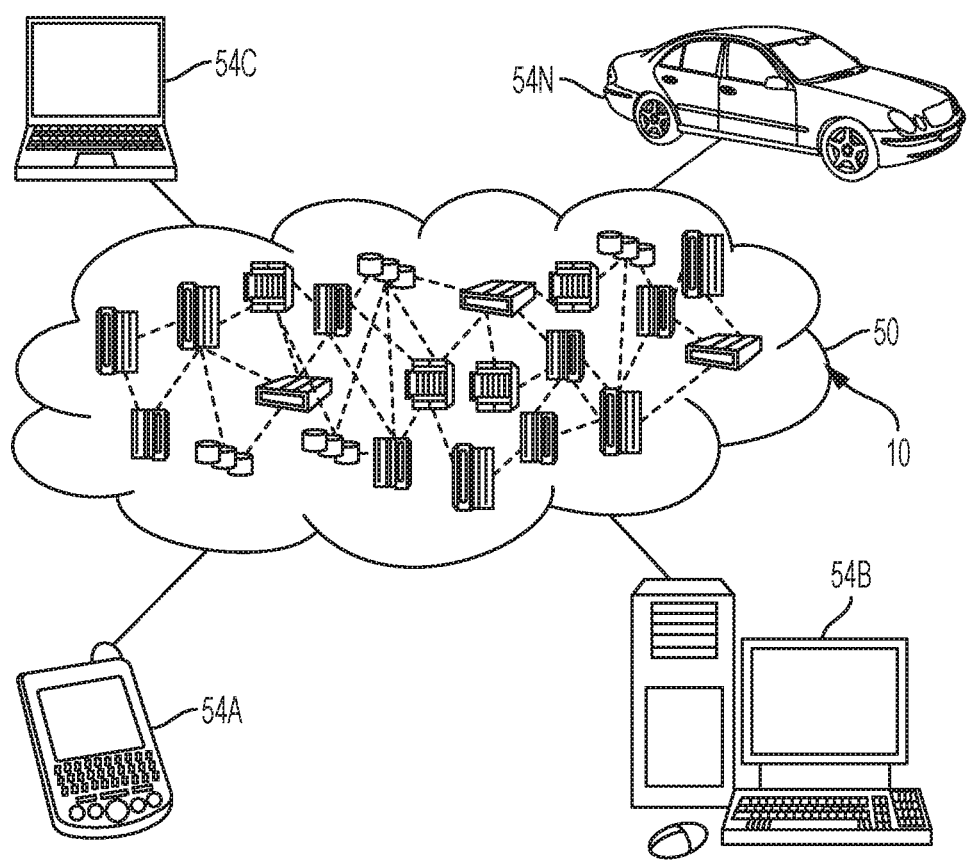
FIG. 1 depicts a cloud computing environment according to one or more embodiments of the present invention.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
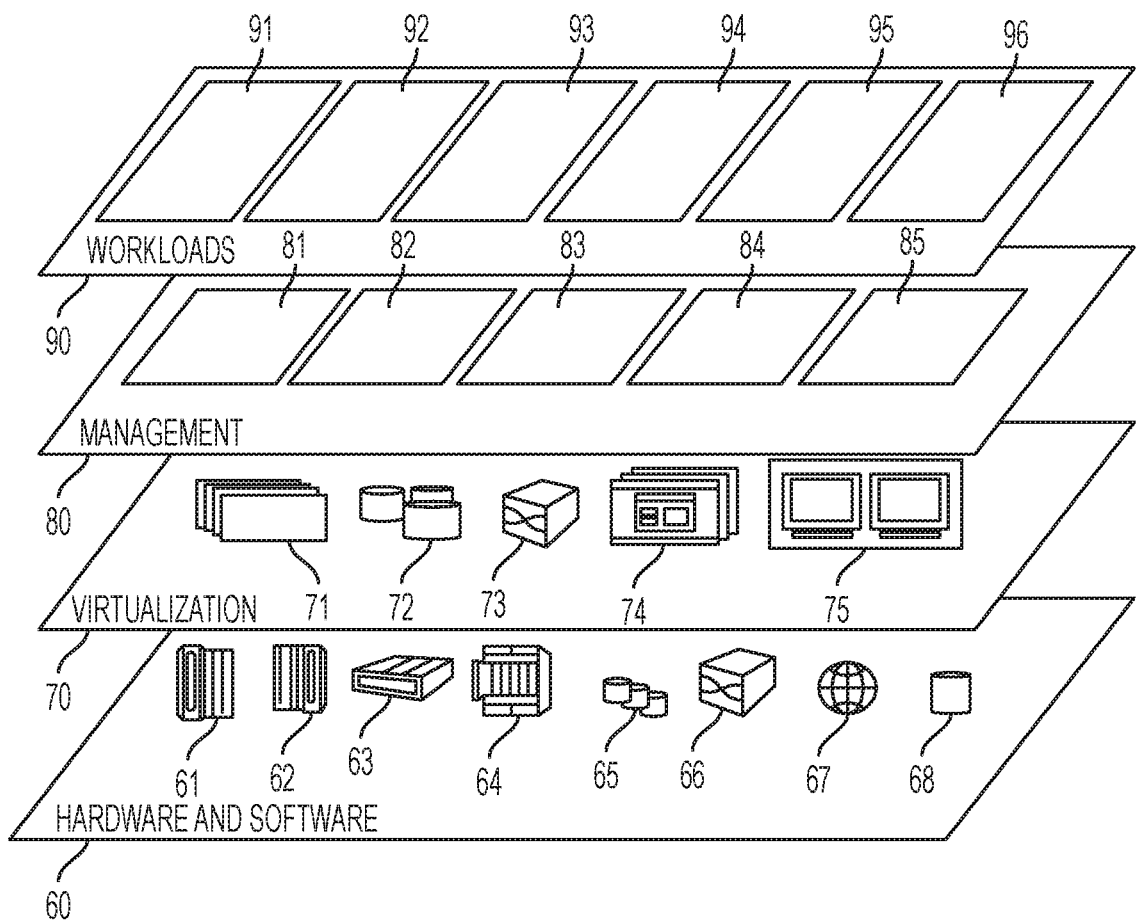
FIG. 2 depicts abstraction model layers according to one or more embodiments of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and a method 96 for utilizing various data to determine the effectiveness of a software testing procedure in accordance with one or more embodiments of the present invention.

Figure 3:
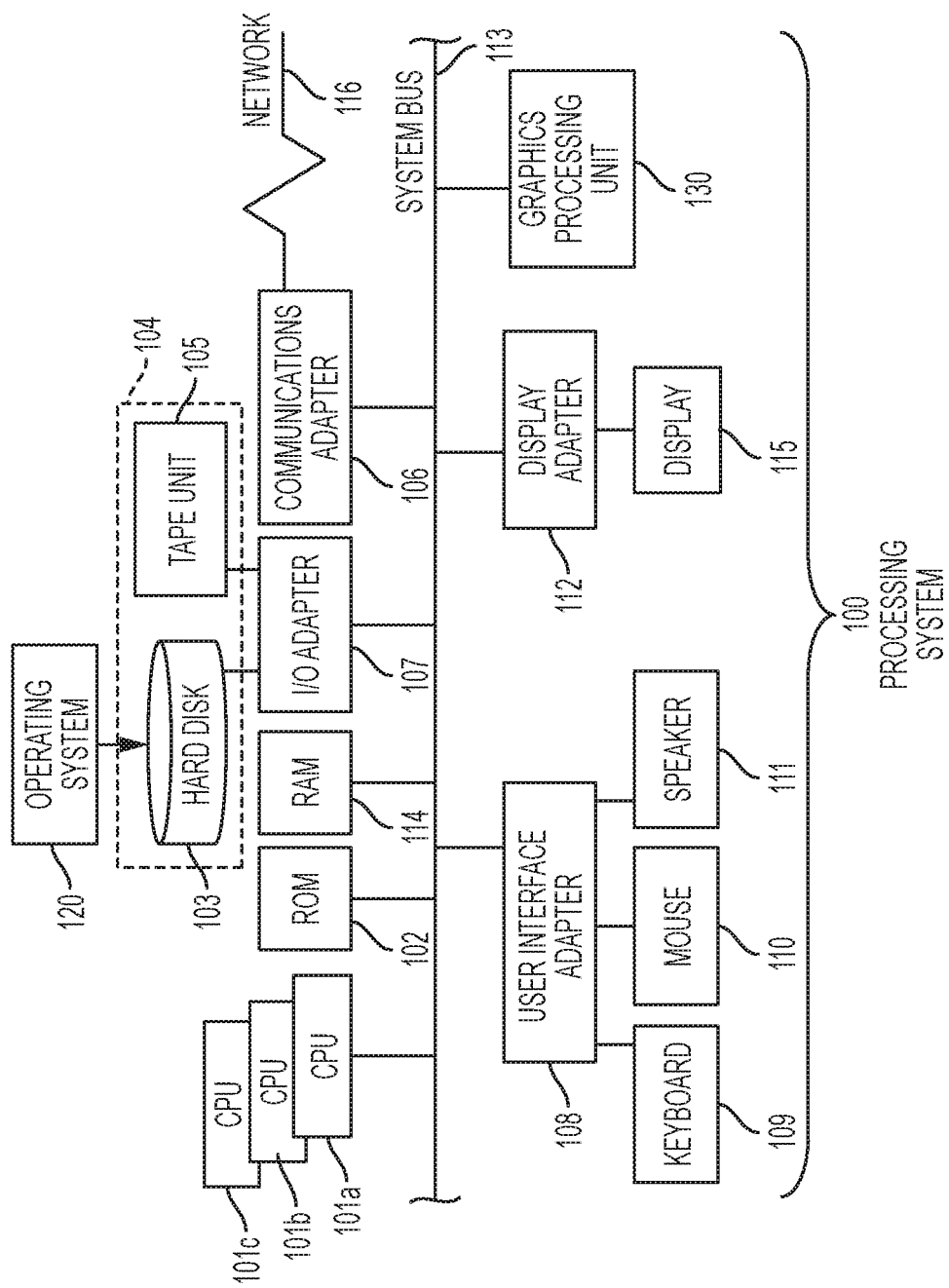
FIG. 3 is a block diagram illustrating one example of a processing system for practice of the teachings herein.

Referring to FIG. 3, there is shown a processing system 100 for implementing the teachings herein according to one or more embodiments. The system 100 has one or more central processing units (processors) 101*a*, 101*b*, 101*c*, etc. (collectively or generically referred to as processor(s) 101). In one embodiment, each processor 101 may include a reduced instruction set computer (RISC) microprocessor. Processors 101 are coupled to system memory 114 and various other components via a system bus 113. Read only memory (ROM) 102 is coupled to the system bus 113 and may include a basic input/output system (BIOS), which controls certain basic functions of system 100.

FIG. 3 further depicts an input/output (I/O) adapter 107 and a network adapter 106 coupled to the system bus 113. I/O adapter 107 may be a small computer system interface (SCSI) adapter that communicates with a hard disk 103 and/or tape storage drive 105 or any other similar component. I/O adapter 107, hard disk 103, and tape storage device 105 are collectively referred to herein as mass storage 104. Operating system 120 for execution on the processing system 100 may be stored in mass storage 104. A network adapter 106 interconnects bus 113 with an outside network 116 enabling data processing system 100 to communicate with other such systems. A screen (e.g., a display monitor) 115 is connected to system bus 113 by display adaptor 112, which may include a graphics adapter to improve the performance of graphics intensive applications and a video controller. In one embodiment, adapters 107, 106, and 112 may be connected to one or more I/O busses that are connected to system bus 113 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 113 via user interface adapter 108 and display adapter 112. A keyboard 109, mouse 110, and speaker 111 all interconnected to bus 113 via user interface adapter 108, which may include, for example, a Super I/O chip integrating multiple device adapters into a single integrated circuit.

In exemplary embodiments, the processing system 100 includes a graphics processing unit 130. Graphics processing unit 130 is a specialized electronic circuit designed to manipulate and alter memory to accelerate the creation of images in a frame buffer intended for output to a display. In general, graphics processing unit 130 is very efficient at manipulating computer graphics and image processing, and has a highly parallel structure that makes it more effective than general-purpose CPUs for algorithms where processing of large blocks of data is done in parallel.

Thus, as configured in FIG. 3, the system 100 includes processing capability in the form of processors 101, storage capability including system memory 114 and mass storage 104, input means such as keyboard 109 and mouse 110, and output capability including speaker 111 and display 115. In one embodiment, a portion of system memory 114 and mass storage 104 collectively store an operating system to coordinate the functions of the various components shown in FIG. 3.

In accordance with one or more embodiments of the present invention, methods, systems, and computer program products are disclosed for utilizing various data to determine the effectiveness of a software testing procedure in accordance with one or more embodiments of the present invention.

One or more embodiments of the present invention allow an organization to better allocate its software test resources to provide for relative maximum productivity and value. Multiple system level test teams within an organization often run the same workload for a given software component, many times in the same configuration or model. Some test teams run these workloads frequently and others run them infrequently. Some test teams are relatively focused and diligent and run the workloads at high stress levels, while other test teams run the workloads at much lower stress levels and without much focus. As a result, some of the test teams are relatively more productive at finding defects in the software than others. Yet, it is almost always true that an organization's test resources are limited and risks must be assessed and taken.

Further, it is not at all uncommon to run tests and workloads that are not productive. Even with the best intentions, without empirical data to either confirm or deny the value of a test to the business, it is difficult to fund and manage a large test operation and know that the investment funds are used to get the best possible results. In the testing of customer software, results mean finding defects that the customer is likely to encounter, not just defects that can be found. Accordingly, embodiments of the present invention provide a method for determining, from a test investment perspective, how an organization can better spend its limited test dollars to yield the highest overall productivity and best return on its investment.

In addition, one or more embodiments of the present invention utilize undisputable facts, or workload run facts and problem discovery facts, to better ensure that accurate and factual information is used to determine an organization's investment in the software testing process. This is advantageous because systems level tests typically require expensive test system resources and highly skilled personnel.

Further, one or more embodiments of the present invention utilize a body of available customer data, test workload execution run facts data, and defect tracking data together with big data analytics to assist in a better understanding of the confirmation or denial of value of an organization's testing procedures. Not only may defect effectiveness be used as a criterion, but also workload variance is a relatively good measure of test effectiveness.

Figure 4:
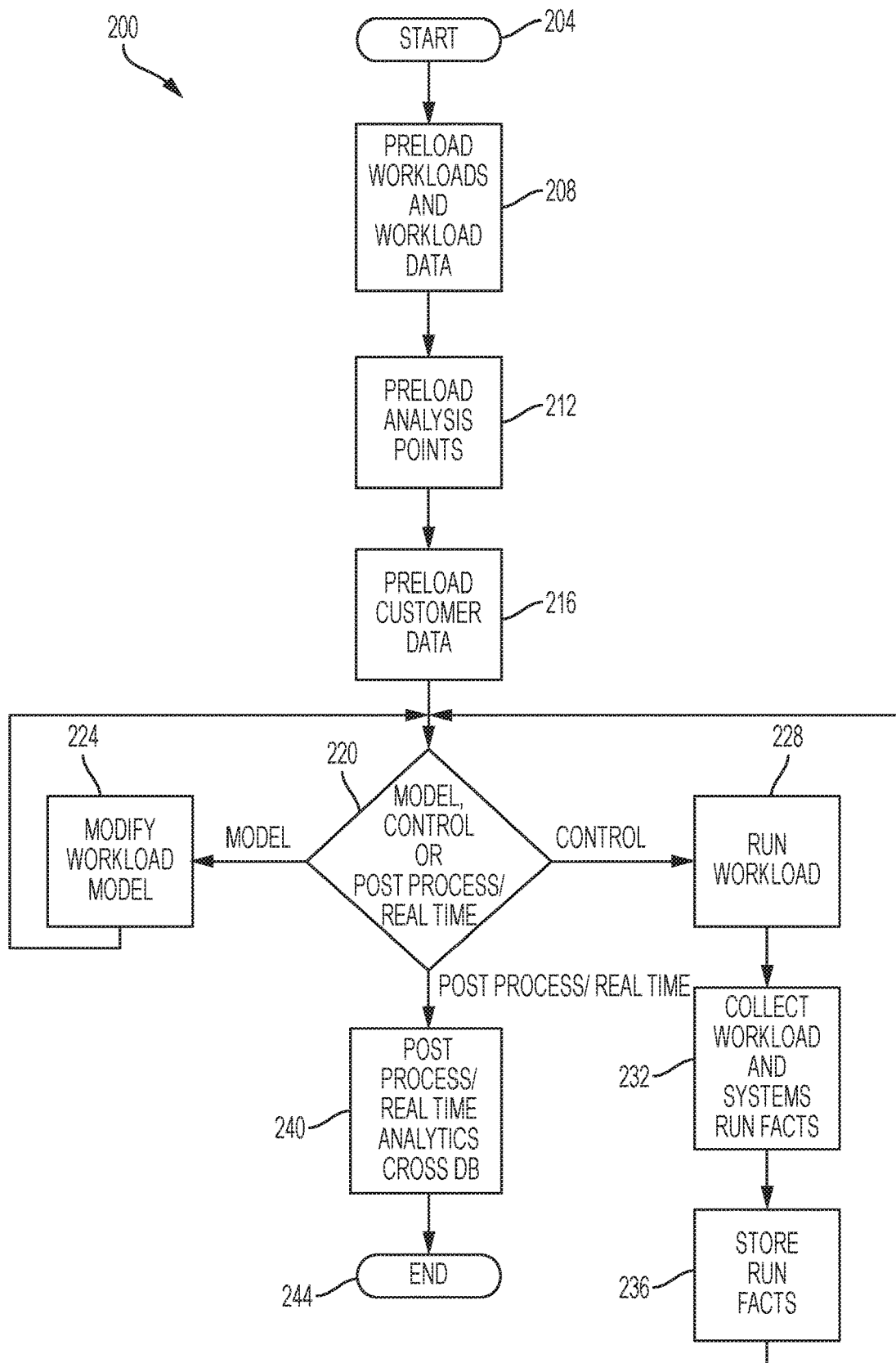
FIG. 4 is a flow diagram of a method for utilizing various data to determine the effectiveness of a software testing procedure in accordance with one or more embodiments of the present invention.

Referring now to FIG. 4, there illustrated is a flow diagram of a method 200 for utilizing various data to determine the effectiveness of a software testing procedure. Referring also to FIG. 5, there illustrated is a block diagram of a system 300 having two databases ("DB2") 304, 308 that store various types of data for use with the method 200 of FIG. 4 and in accordance with one or more embodiments of the present invention.

In exemplary embodiments, the functional features of the method 200 of FIG. 4 may be executed by computing or processing components within the cloud computing environment 50 of FIG. 1, or in the processing system 100 of FIG. 3, or in some other type of computing or processing environment. Also, the two databases 304, 308 may be implemented within the cloud computing environment 50 of FIG. 1, or in the processing system 100 of FIG. 3, or in some other type of computing or processing environment.

After a starting operation in block 204, blocks 208, 212 and 216 operate to store workloads and workload data in the database 304. The workload run facts database schema groups test run time data around a run facts ID. The run facts ID ties all of the preloaded schema data 208 with the run time workload and systems feedback data 232, 236 that makes up the big data portion of the data store in the database 304.

The preloaded data 208, 212, 216 includes data detailing the eligible test bed environments, the systems in the environments, specific testers in the environments, workload metadata including components under test and models, the analysis point groups and their analysis points containers of data points, the system configs or setup data, etc.

Once the data has been preloaded in the operations 208, 212, 216, the method 200 executes a decision operation in a block 220 which chooses from a model path that modifies the workload model in the block 224, a control path 228, 232 and 236 that runs a workload and collects and stores workload and systems runfacts therefrom, or a path 240 that allows for one of post processing analytics or run time analytics of the data using analytics tools. After the post processing or run time operation 240, the method 200 may then end in the block 244.

The run time data stored in the database 304 may include, for example, the workload controls, workload feedback, system feedback, system alerts, system errors, and workload errors. The run time data along with the preloaded data make up the body of runfacts that can be analyzed in the block 240 by post processing or run time analyzing the data using analytic tools such as, for example, analytic, modeling, cognitive, and reporting products to perform the analysis. The analysis performed in the operation 240 includes tying in all of the data down to the tester who ran the test and that tester's history to score multiple aspects of the runfacts such as, test to customer cluster proximity, test to customer activity intersection, most defect removing and productive workloads, environments, systems, testers, etc.

The post processing or run time analysis data includes the runfacts data store stored in the database 304 and test's defect tracking data store records 320 as stored in the database 308. Using both sets of data together in the near real time (i.e., run time) analysis or in the post processing analysis allows multidimensional analytics to be applied to help an organization understand the value of its tests, workloads, environments, testers, etc., to the organization.

In addition, once the workload run facts have been collected for multiple test teams and the various test environments, the aforementioned analytic, modeling, cognitive, and reporting products may be used in the block 240 to generate business analytics reports. These reports can be used to guide informed test business decisions about which test teams, which of their multiple test environments, and which workload models are most productive at finding defects. The workload configuration or model, the workload feedback, and the system feedback run facts can be correlated with problem discovery data to indicate test workload configuration or model, and test team and their multiple test environments effectiveness. This allows for grading of test efforts and their individual test environments regarding workload run participation and success or productivity based on 30, 60, 90, and greater than 90 day categories. Also, grading may be performed using a release by release scope. This grading information can be used along with problem discovery for each test team such as integration test and system test. Then within the overall scope of the test teams and their various test beds such as System Test's IST, DFSMS test, Combat, general SVT or Integration Test's, IT, Service Test, etc. use the analysis data to provide a correlation of workload run facts with problem discovery. Provide a grade from 0 to 100 to indicate the value of the test teams' participation in certain testing to determine the business value. This information may be used, for example, to invest in productive tests and divest in the tests that are not productive.

One or more embodiments of the present invention also provide the capability to add variability to workloads. This solves the problem of running the same workload, the same way, over and over again in multiple test teams in their various test environments. If the only variant of the repeated test runs with the same configuration is when new or modified code is dropped into the test, then once the code is available for test, running the same workload configuration or model over and over again and expecting is different result does not instill great confidence with regard to problem discovery.

Instead, one or more embodiments of the present invention involve test collecting workload run facts each time a workload is exercised in any of the available test environments. These workload run facts include the workload configuration or model information, workload feedback data, and system feedback data. The workload feedback data includes information such as the transaction mix or workload model, number of simulated users, the transaction rate, the failure rates per transaction, and the number and distribution of errors and failures. The system feedback data includes the empirical systems data that shows how the target component is being exercised with regard to functional activity as well as levels of load and stress. The empirical system data is comprised of performance and accounting data that is readily available in the system (e.g., Z) operating environment.

In addition, one or more embodiments of the present invention utilize a workload portal concept to develop test tooling. As a component of a workload portal, a DB2 database 304 may be created that is compatible with the analytics tool requirements. In this database 340, workload run facts data 312 is stored that includes the workload configuration model information. This includes the transaction or thread type mix and distribution of the transactions or threads. The workload model can be thought of as a mixer of sorts. If a workload has two transactions or threads, transaction A and transaction B, one can run the workload with an equal distribution for the two transactions. Thus, as the workload simulation runs, the transactions are executed with an equal distribution. Over the workload run each transaction may, for example, be run 100 times each. However, if the distribution were modeled or mixed to run transaction A with a distribution of one and transaction B with a distribution of five, then transaction B would be run five times for every time transaction A were run.

The model or mix can be stored in the DB2 304 as part of the workload run facts data. This model or mix is one part of the input to the analytics operation 240 and may, on its own, be used to create a useful analysis to determine workload model to defect discovery correlation. Additionally, if one includes workload feedback in the form of number of simulated users, transaction rate, total errors, and error distribution, then one can provide additional input into the analytics so that there is also an understanding of specific workload run time characteristics that correlate to productive defect discovery.

Additionally, the system feedback can also be used as input to the analytics 240 to enable understanding of which system pressure points correlate to productive defect discovery. All of the aforementioned workload run facts help to build an historical record of all testing for the given workload and target component(s).

In other embodiments, this historical data may be used in a similar approach to determine the best test team and test environment to trust with critical situation tests and recreate where time to resolution is a major business concern.

One or more embodiments of the present invention provide a solution that includes methods, systems and computer program products for a traditional processing environment or a cloud computing environment based set of exploitable services that make up a test workload execution diary that includes customer data contrasting and comparison. All information needed for analysis is brought together in a test control and data collection model called workload portal. The workload portal is a link between the test operator, the test system, and the test data. The services include workload modeling so that variation for workloads can be accomplished, system configuration so that workload and system setup can be varied, workload control to increase load, alter the execution model, provide visual workload feedback such as rates and errors, visual system feedback with customer data convergence visualization, system alerts for out of convergence issues, and all while making a diary of the workload run.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

As used herein, the articles "a" and "an" preceding an element or component are intended to be nonrestrictive regarding the number of instances (i.e., occurrences) of the element or component. Therefore, "a" or "an" should be read to include one or at least one, and the singular word form of the element or component also includes the plural unless the number is obviously meant to be singular.

As used herein, the terms "invention" or "present invention" are non-limiting terms and not intended to refer to any single aspect of the particular invention but encompass all possible aspects as described in the specification and the claims.

As used herein, the term "about" modifying the quantity of an ingredient, component, or reactant of the invention employed refers to variation in the numerical quantity that can occur, for example, through typical measuring and liquid handling procedures used for making concentrates or solutions. Furthermore, variation can occur from inadvertent error in measuring procedures, differences in the manufacture, source, or purity of the ingredients employed to make the compositions or carry out the methods, and the like. In one aspect, the term "about" means within 10% of the reported numerical value. In another aspect, the term "about" means within 5% of the reported numerical value. Yet, in another aspect, the term "about" means within 10, 9, 8, 7, 6, 5, 4, 3, 2, or 1% of the reported numerical value.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system for improved software testing comprising:
   a processor in communication with one or more types of memory, the processor configured to:
   preload into a database data related to workloads and workload data, data related to analysis points, and customer data;
   determine whether to modify a workload model, to run a workload or to perform one of post processing analytics or run time analytics;
   responsive to running a workload, collect workload run facts comprising a workload configuration or model information, workload feedback data, and system feedback data, wherein the workload feedback data comprises one or more of a transaction mix, number of simulated users, a transaction rate, failure rate per transaction and a number and distribution of errors and failures;
   perform one of post processing analytics or run time analytics of the data preloaded into the database; and
   provide visual workload feedback including rates and errors, or visual system feedback with customer data convergence visualization, or system alerts for out of convergence issues, via a display.

2. The system of claim 1 wherein the processor configured to determine whether to modify a workload model, to run a workload or to perform one of post processing analytics or run time analytics comprises the processor configured to modify a workload model.

3. The system of claim 1 wherein the processor configured to determine whether to modify a workload model, to run a workload or to perform one of post processing analytics or run time analytics comprises the processor configured to run a workload.

4. The system of claim 3 wherein the processor configured to run a workload comprises the processor configured to collect and store workload data and system runfacts data.

5. The system of claim 4 further comprising the processor configured to perform one of post processing analytics or run time analytics of the data preloaded into the database and of the stored workload data and the system runfacts data.

6. The system of claim 5 wherein the processor configured to perform one of post processing analytics or run time analytics further comprises the processor configured to generate business analytics reports.

7. The system of claim 4 wherein the further comprising performing, by the processor, one of post processing analytics or run time analytics of test defects data.

8. A computer program product for improved software testing comprising:
   a non-transitory storage medium readable by a processing circuit and storing instructions for execution by the processing circuit for performing a method comprising:
   preloading, by a processor, into a database data related to workloads and workload data, data related to analysis points, and customer data;
   determining, by the processor, whether to modify a workload model, to run a workload or to perform one of post processing analytics or run time analytics;
   responsive to running a workload, collecting workload run facts comprising a workload configuration or model information, workload feedback data, and system feedback data, wherein the workload feedback data comprises one or more of a transaction mix, number of simulated users, a transaction rate, failure rate per transaction and a number and distribution of errors and failures;

performing, by the processor, one of post processing analytics or run time analytics of the data preloaded into the database; and providing visual workload feedback including rates and errors, or visual system feedback with customer data convergence visualization, or system alerts for out of convergence issues, via a display.

9. The computer program product of claim 8 wherein determining, by the processor, whether to modify a workload model, to run a workload or to perform one of post processing analytics or run time analytics further comprises the processor modifying a workload model.

10. The computer program product of claim 8 wherein determining, by the processor, whether to modify a workload model, to run a workload or to perform one of post processing analytics or run time analytics comprises the processor running a workload.

11. The computer program product of claim 10 wherein the processor running a workload comprises the processor collecting and storing workload data and system runfacts data.

12. The computer program product of claim 11 further comprising performing, by the processor, one of post processing analytics or run time analytics of the data preloaded into the database and of the stored workload data and the system runfacts data.

13. The computer program product of claim 12 wherein the processor performing one of post processing analytics or run time analytics further comprises the processor generating business analytics reports.

* * * * *